UNITED STATES PATENT OFFICE 2,448,260

POLYVINYL ETHERS

Nestor Winston Flodin, Niagara Falls, N. Y., assignor to E. I. du Pont de Nemours & Company, Wilmington, Del., a corporation of Delaware No Drawing. Application October 16, 1944, Serial No. 558,970

4 Claims. (Cl. 260—90)

This invention relates to vinyl resins and has for its object the production of a novel type of vinyl resin derived from polyvinyl alcohol and the like. A further object is the production of novel polymeric vinyl ethers. Still other objects will be apparent from the following description of my invention.

I have discovered that polyvinyl alcohol and similar polyvinyl compounds containing hydroxyl groups can be reacted with cyclic $\alpha,\beta$-unsaturated ethers to produce novel resinous condensation products having valuable properties. The invention is illustrated by the following examples:

Example I

To an aqueous solution of polyvinyl alcohol at room temperature a trace of HCl was added, followed by dihydropyran. A soft, somewhat rubbery precipitate formed with moderate heat evolution. On drying the product resembled hard rubber, but was insoluble in the common solvents.

Example II

Nine and one-half grams of polyvinyl alcohol, 12.5 g. dihydropyran, and 2 g. ammonium chloride were stirred in 200 g. dioxan at reflux for several hours. A swollen gel-like mass was formed. This was allowed to stand at 90° C. overnight without stirring, but there was no further change. The swollen resin particles were poured into methanol and there formed a fine powder, which was extracted with boiling methanol twice, then dried at 70° C. overnight.

The product was tan-colored and somewhat lumpy. Weight of product recovered was 22 g.; handling loss was probably 2–3 g. The total yield indicates that 75–80 per cent of the hydroxyl groups reacted with dihydropyran.

Example III

A slurry of 44 g. of polyvinyl alcohol and 10 g. ammonium chloride was stirred in 900 g. dihydropyran at reflux overnight. There was no marked reaction after 2.5 hours, but after 18 hours the mixture was a thick swollen mass. This was stirred at 80–85° C. for 48 hours longer in the hope of obtaining a solution, but there was no further change. The product was poured into two volumes of methanol to precipitate the polyvinyl tetrahydropyryl ether. The polymer was extracted with hot methanol twice, then dried at room temperature to a tan-colored powder.

Example IV

Forty-three grams of polyvinyl acetate was dissolved in a mixture of 84 g. dihydropyran and 200 g. methanol. The solution was heated to reflux and 17 g. concentrated hydrochloric acid added. After 6 hours refluxing the mixture had become very thick, although no precipitation had occurred. It was poured into water to precipitate the polymer. The product was extracted with hot water to which alkali was added in small portions to a permanent slight basic reaction. After several more extractions with hot water the resin was dried at 70° C. for 48 hours. The product was hard and light tan in color. Yield, 30 g. By saponification of acetate groups in the polymer, and from the yield, it was determined that 7 per cent of the hydroxyl groups were acetylated and 17 per cent were reacted with dihydropyran. Molded with 20 per cent its weight of glycerol, the polymer gave a transparent yellow chip of Shore hardness 55–60, soft, tough, and flexible.

Example V

A mixture of 4.0 g. polyvinyl alcohol, 25 ml. dihydropyran, and 0.1 g. ammonium nitrate was heated at reflux for one hour. The swollen solidified mass was diluted with methanol and filtered. The product was washed with methanol, filtered, and dried at 75° C. Yield of pale tan tetrahydropyryl ether of PVA—5.65 g.; estimated loss—0.5 g.; net yield—6.15 g. Approximately 28 per cent of the hydroxyl groups of the PVA were reacted.

Example VI

A mixture of 5 g. polyvinyl alcohol, 25 ml. furyl alcohol, and 0.25 g. ammonium chloride was heated at 125° C. overnight. The entire mass solidified to a red-brown resin.

Example VII

A small amount of polyvinyl alcohol, a few grains of ammonium chloride, and several ml. of furfuryl acetate were heated in a test tube at 125° C. for eight hours. The product was filtered off, washed with methanol, and dried at 70° C. The product dried to a pale tan powder that was insoluble in cold and in boiling hot water, and also in 1 N hydrochloric acid.

The invention may be practiced by reacting the unsaturated cyclic ethers with a completely hydrolyzed polyvinyl ester, i. e., polyvinyl alcohol, or with any partially hydrolzed polyvinyl ester which contains one or more hydroxyl groups. If a polyvinyl alcohol for this purpose is prepared by complete hydrolysis of polymerized vinyl ester, the nature of the ester is immaterial. If a partially hydrolyzed vinyl ester is utilized, the vinyl polymer will contain both ester groups and hydroxyl groups, and the properties of the vinyl polymer and the resulting polymeric ether produced according to my invention will be modified accordingly. For this purpose I may utilize any known polyvinyl ester, for example, polyvinyl formate, polyvinyl acetate, polyvinyl propionate, polyvinyl butyrate, polyvinyl oleate, polyvinyl stearate, polyvinyl sulfonate, polyvinyl benzoate, and the like.

Also the invention is not restricted to reacting the cylic ethers with the hydrolysis products of polymers of a pure vinyl ester, but applies as well to copolymers of vinyl esters. Such copolymers may be made by polymerizing mixtures of two or more vinyl esters or mixtures of vinyl esters with other polymerizable compounds, for example, vinyl halides, vinylidene halides, vinyl ethers; acrylic acid and its derivatives, e. g., acrylonitrile, acrylic esters and acrylamide, methacrylic acid, methacrylates, and the like. In short, the reaction of the present invention may utilize the hydrolysis product of any resinous polymer which contains the group:

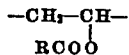

where R presents hydrogen or an organic radical, e. g., alkyl or aryl.

The invention may also be practiced by bringing together a polymer or copolymer of a vinyl ester and an unsaturated cylic ether under conditions where hydrolysis (or alcoholysis) of the ester will occur, as illustrated by Example IV. For such purpose I prefer to have present sufficient acidic material to cause the desired hydrolysis; such acidic material then also catalyzes the reaction between the hydrolysis product and the cyclic ethers. If alkali is used to hydrolyze the polymerized vinyl ester, the reaction mixture must be acidified to catalyze the final reaction with the cyclic ether. In place of the methanol of Example IV, I may use other hydrolytic alcohols such as ethanol, propanol, or the like, or I may use an aqueous system, e. g., emulsion or suspension, or both water and alcohol may be used to convert the polymerized ester to its hydrolysis product.

The reaction products obtained according to my invention also will vary, depending upon the number of the hydroxyl groups present which take part in the reaction with the unsaturated cylic ether. Thus, all or part of the hydroxyl groups present in the polyvinyl reactant may be replaced by the cyclic ether groups. The properties of the product therefore may be modified as desired by the number of ether groups thus formed. For this purpose the extent of reaction may be varied by control of reaction conditions. In general the amount of hydroxyl groups entering the reaction will vary directly with the temperature and time of reaction. Thus at relatively low temperatures and short time of contact, partial etherification will occur, whereas at elevated temperatures, e. g., 100° C. or higher for a sufficient length of time, complete etherification may be accomplished. The time and temperature conditions required to produce any desired extent of etherification also will depend upon the nature of the cylic ether used and also to some extent on the kind and amount of catalyst and the presence or absence of solvent.

Cyclic ethers which have an unsaturated carbon-carbon bond adjacent to the oxygen atom in the ring may be utilized as reactants in practicing my invention. Such cyclic ethers may, if desired, contain more than one oxygen atom in the ring and may have substituent groups outside the ring, for example, hydroxyl groups, ester groups, and acid groups. One example of a type of cyclic ether suitable for my invention is furan and derivatives of furan, otherwise known as furyl compounds. Such furyl compounds include, for example, furfuryl alcohol and its esters, α, β-dihydrofuran, methyl furan, furacrylic acid, furoic acid, and the like. Another group of cylic ethers includes pyran, dihydropyran, and their derivatives. Still other examples of cylic ethers suitable for practicing my invention are:

2,6-dimethyl-γ-pyrone
 Maltol (2-methyl-3-hydroxy-pyrone)
 2-methyl-3-acetoxy-pyrone
 Pyromeconic acid (3-hydroxy-pyrone)
 3-acetoxy-pyrone
 Kojic acid (2-methylol-5-hydroxy-pyrone)
 αα'-Dimethyl furan
 Furilic acid and its esters
 Pyromucic acid and its esters
 Coumarone
 Dimethyl coumarone
 1,2-epoxy-propene-1
 2-methyl-4,5-dihydrofuran
 Divinylene dioxide (1,4-dioxin)
 Vinylene o-phenylene dioxide A variety of reaction conditions may be utilized in carrying out the herein-described reaction between the hydroxyl containing vinyl compound and the cyclic ether. The reaction generally is somewhat exothermic and usually occurs more or less readily at relatively low temperatures, including room temperature. The reaction rate may be increased by elevating the temperature, and generally I prefer to heat the reaction mixture to temperatures up to around 100 to 200° C. when it is desired to react all or a large portion of the hydroxyl groups of the vinyl component with the cyclic ether. The reaction may be carried out without using any solvent or by utilizing a solvent for the reaction for one or both of the reactants, as desired.

Depending on their content of ether groups, the herein-described polyvinyl ethers vary from hard, inflexible products to soft materials which can be milled without plasticizer at 50° C. to give transparent pliable sheets of leathery texture. These polymers are characterized by excellent solvent resistance. The polyvinyl ethers, made by reacting from 17 per cent to more than 80 per cent of the hydroxyl groups of polyvinyl alcohol with dihydropyran, are soluble in 90 per cent formic acid, but insoluble in the common organic solvents of all types, as well as in water. The more highly reacted ethers are swollen very little by water and methanol and considerably swollen by ethers, glacial acetic acid, and solvents whose molecules are of cyclic structure. Conversely, the polyvinyl ethers in which only about 20 per cent of the hydroxyl groups are reacted with dihydropyran are swollen greatly by methanol and somewhat by water, but are little affected by most of the common organic solvents. The optimum properties of general solvent resistance are to be expected in products made by reacting somewhere between 20 per cent and 75 per cent of the hydroxyl groups of polyvinyl alcohol, The reaction products of polyvinyl alcohol with furan and other furyl compounds are generally obtained as white to tan powders which are insoluble in water and the common organic solvents. They may be molded under pressure at 165° C. with glycerol, glycol, and polyglycols to produce tough, flexible, solvent-resistant articles.

The herein-described novel products of my invention may be processed by incorporating conventional plasticizers. For example, the more highly reacted polyvinyl tetrahydropyryl ethers may be softened by triethylene glycol, Flexol 3GH (triethylene glycol dihexanoate), Santicizer M-17 (methyl phthalyl ethyl glycolate), and the reaction products of ethylene glycol and glycerol with dihydropyran.

Other conventional plasticizers may be used with the highly reacted polyvinyl tetrahydropyryl ethers, e. g., dibutyl phthalate, diamyl phthalate, tributyl phosphate, butylene glycol diacetate, triacetin, triethyl citrate, and butyl acetyl ricinoleate. The less highly reacted ethers may be plasticized by glycerol, ethylene glycol, and polyglycols. A 75–80 per cent reacted ether, molded with 40 per cent of its weight of methyl phthalyl ethyl glycolate at 150° C. under only slight pressure, was similar in softness and pliability to "art gum" rubber, had a Shore hardness of 15–20, and retained some flexibility even at −20° C. The same polyvinyl ether when unplasticized is flexible at room temperature, but cracks when bent at 15° C.

The polyvinyl tetrahydropyryl ethers in general are good adhesives for glass, wood, and metal. The highly reacted polymers in particular form strong bonds with glass, wood, and smooth sheet iron when heat-sealed under pressure at temperatures above 100° C. Either the plasticized or unplasticized resins may be used.

I claim:

1. The process comprising reacting polyvinyl alcohol with dihydropyran in the presence of an acid catalyst until about 20 to 80% of the hydroxyl groups in said polyvinyl alcohol have reacted with dihydropyran.

2. A resinous substance comprising the product of reaction between polyvinyl alcohol and dihydropyran in which about 20 to 80% of the hydroxyl groups of said polyvinyl alcohol have reacted with dihydropyran.

3. The process which comprises reacting dihydropyran with the hydrolysis product of a polymerized vinyl ester of a carboxylic acid until at least 17° of the hydroxyl groups of said hydrolysis product have reacted with dihydropyran.

4. A resinous substance comprising the product of reaction between dihydropyran and the hydrolysis product of a polymerized vinyl ester of a carboxylic acid, in which at least 17% of the hydroxyl groups of said hydrolysis product have reacted with dihydropyran.

NESTOR WINSTON FLODIN.

REFERENCES CITED

The following references are of record in the file of this patent:

UNITED STATES PATENTS

| Number | Name | Date |
|---|---|---|
| 2,227,975 | Kenyon | Jan. 7, 1941 |
| 2,267,830 | Lewis | Dec. 30, 1941 |
| 2,332,896 | D'Alelio | Oct. 26, 1943 |
| 2,358,355 | Stamatoff | Sept. 19, 1944 |
| 2,366,049 | Payne | Dec. 26, 1944 |
| 2,399,055 | Nordlander | Apr. 23, 1946 |